M. LEBLANC.
PULLEY FOR HIGH SPEED TRANSMISSION.
APPLICATION FILED DEC. 6, 1912.
1,218,674.   Patented Mar. 13, 1917.
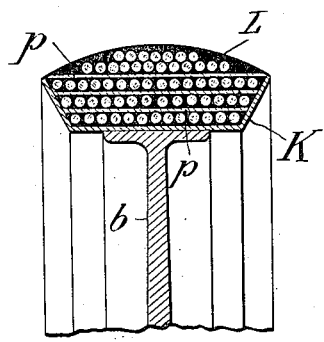
WITNESSES:
INVENTOR:
Maurice Leblanc
By Attorneys,

UNITED STATES PATENT OFFICE.

MAURICE LEBLANC, OF VAL SUR SEINE, PAR CROISY, FRANCE, ASSIGNOR TO SOCIÉTÉ ANONYME POUR L'EXPLOITATION DES PROCÉDÉS WESTINGHOUSE-LEBLANC, OF PARIS, FRANCE.

PULLEY FOR HIGH-SPEED TRANSMISSION.

1,218,674. Specification of Letters Patent. Patented Mar. 13, 1917.

Application filed December 6, 1912. Serial No. 735,256.

*To all whom it may concern:*

Be it known that I, MAURICE LEBLANC, of Val sur Seine, par Croisy, Seine et Oise, France, have invented new and useful Improvements in Pulleys for High-Speed Transmission, of which the following is a specification.

The advance that has occurred in industry by the employment of steam turbines has long since brought into prominence the question of the transmission of motion between a shaft turning several thousand times a minute and a shaft rotating at less speed.

Up to the present one has generally been content to construct turbines to turn as slowly as possible and to design apparatus to turn as quickly as to enable it to be driven directly, that is to say to connect together two machines both of which work under difficult or even undesirable conditions.

This is not capable of a problematical solution and high speed gearings have to be employed in cases where one cannot absolutely do otherwise.

It has been proposed to substitute for these gearings, which are expensive and of a heavy nature, a transmission by pulleys and belts.

This invention relates to such a transmission, with very light belts capable of a linear speed of 70 to 100 meters per second, which leads to the employment, even for more rapid angular speeds of a turbine, of pulleys having a sufficiently large diameter to enable a supple belt to cling to its surface.

The present invention has for its object a pulley that can acquire without danger peripheral speeds of 80 and 100 meters per second that are essential for this kind of transmission.

A cast iron pulley cannot evidently run, without failure, at such a peripheral speed; steel pulleys are expensive and heavy, which is a great drawback to high speeds.

The rim ought itself to be able to resist the centrifugal force. Now, it is known that with equal length and mass, filaments composed of vegetable or animal fibers are more resisting than steel bands.

A hoop, formed for example, with glued ramie threads or filaments will resist centrifugal force better than a steel ring of the same geometrical figure and turning at the same speed.

Moreover, the ramie hoop will be about seven times lighter than the other. The particular characteristic of a pulley according to this invention is in forming the felly or rim by a bobbin of animal or vegetable filaments impregnated with an agglutinant such as vulcanized caoutchouc, gelatin, or artificial cellulose as cellit, viscose, loreid, etc.

An embodiment of the invention is illustrated in the accompanying drawing wherein is shown a transverse sectional view of the pulley.

In the figure, is represented, by way of example, a section of a pulley which has a steel nave and arms $b$ supporting a band K of thin plate, such as is used for bicycles. The pulley being mounted on a shaft, there is wrapped around the band K a long continuous filament of ramie, cotton, flax, hemp, silk, camel hair, or other suitable substance, in regular and successive layers which are successively impregnated with an agglutinant, each fresh layer being left to dry if the agglutinant is applied in solution, *e. g.* gelatin, or artificial cellulose, or at the end the entire pulley is placed in a vulcanizing furnace if caoutchouc is used. This filar structure forming the rim of the pulley is designated by L.

The tension with which the filament is wound will be determined exactly, and will change from one layer to another so that it will always at least be equal to that resulting from centrifugal force during rotation. Any form can be given to the rim, cylindrical (flat face) or arched (crown face), with one or more grooves, etc. It can be of any size and be such as to constitute a drum.

Fly wheels can be similarly constructed, the mass of which will be particularly small compared with the stored power.

The body of the pulley and the light band serving to support the bobbin can be formed in any desired manner. They may be of paper or compressed pasteboard, protected or reinforced with vegetable or animal fibers.

In the direction transverse to the different spirally wound layers, circular bands $p$ $p$ may be disposed between consecutive spirally wound layers, as shown, forming a cylinder around the pulley, which bands may be formed of filaments or threads of vegetable or animal fibers agglutinated together.

What is claimed is:—

1. A pulley having a rim said rim having a tension member comprising spirally wound layers of organic filamentary materials adapted to sustain the centrifugal force acting upon the pulley and a circular band of threads parallel to the axis of the pulley between said spirally wound layers.

2. A pulley having a rim said rim having a tension member comprising spirally wound layers of organic filamentary materials adapted to sustain the centrifugal force acting upon the pulley and a plurality of circular bands of threads parallel to the axis of the pulley between said spirally wound layers.

In witness whereof, I have hereunto signed my name in the presence of two subscribing witnesses.

MAURICE LEBLANC.

Witnesses:
MARCEL ARMENGAND,
HANSON C. COXE.